United States Patent
Luo et al.

(10) Patent No.: US 12,013,513 B2
(45) Date of Patent: Jun. 18, 2024

(54) METASURFACE BASED DEVICE FOR GENERATING ABRUPT AUTOFOCUSING BEAM

(71) Applicant: National Taiwan University, Taipei (TW)

(72) Inventors: Yuan Luo, Taipei (TW); Din Ping Tsai, Taipei (TW); Pan-Chyr Yang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 443 days.

(21) Appl. No.: 17/337,178

(22) Filed: Jun. 2, 2021

(65) Prior Publication Data

US 2021/0373200 A1  Dec. 2, 2021

Related U.S. Application Data

(60) Provisional application No. 63/033,229, filed on Jun. 2, 2020.

(51) Int. Cl.
*G02B 1/00*   (2006.01)
*G02B 5/18*   (2006.01)
*G02B 5/30*   (2006.01)

(52) U.S. Cl.
CPC ........... *G02B 1/002* (2013.01); *G02B 5/1814* (2013.01); *G02B 5/3083* (2013.01); *G02B 2207/101* (2013.01)

(58) Field of Classification Search
CPC .... G02B 1/002; G02B 5/1814; G02B 5/3083; G02B 2207/101; G02B 5/1809; G02B 27/42–425; G02B 2005/1804
See application file for complete search history.

(56) References Cited

U.S. PATENT DOCUMENTS

| | | | |
|---|---|---|---|
| 2019/0025463 A1* | 1/2019 | She | G02B 27/4211 |
| 2019/0154877 A1 | 5/2019 | Capasso et al. | |
| 2019/0294104 A1* | 9/2019 | Rho | G03H 1/2205 |

FOREIGN PATENT DOCUMENTS

CN       106094217 A       11/2016

OTHER PUBLICATIONS

"Autofocusing Airy beams generated by alldielectric metasurface for visible light" by Qingbin Fan, Daopeng Wang, Pengcheng Huo, Zijie Zhang, Yuzhang Liang, and Ting Xu extracted from Research Article of Optic express on vol. 25, No. 8 | Apr. 17, 2017. (https://doi.org/10.1364/OE.25.009285).

(Continued)

*Primary Examiner* — Stephone B Allen
*Assistant Examiner* — Adam W Booher
(74) *Attorney, Agent, or Firm* — Chun-Ming Shih; LANWAY IPR SERVICES (57) ABSTRACT

The present invention provides a device for generating an abrupt autofocusing beam, comprising a light source module, a metasurface phase modulating element, and a focus lens, wherein the light source module generates an incident light beam, the metasurface modulating element has a first optical receiving surface for receiving the incident light beam, and an optical emitting surface having a plurality of dielectric nano-structures formed thereon for modulating the incident light beam into a diffracted light beam wherein the plurality of nano-structures respectively corresponding to optical-phase mask patterns, and the focus lens is arranged at a side of the optical receiving surface for performing optical Fourier transform of the diffracted light beam obtained from the metasurface phase modulating element.

18 Claims, 6 Drawing Sheets

(56) References Cited

OTHER PUBLICATIONS

Official action issued by Taiwan Intellectual and property office on May 23, 2022.
"Abrupt polarization transition of vector autofocusing Airy beams" by Sheng Liu et al. extracted from Jul. 15, 2013 / vol. 38, No. 14 / Optics Letters.
"Phase engineering with all-dielectric metasurfaces for focused-optical-vortex (FOV) beams with high cross-polarization efficiency" by Hammad Ahmed et al. extracted from vol. 10 No. 2/Feb. 1, 2020 / Optical materials Express.
"Propagation of sharply autofocused ring airy gaussian vortex beams" by Bo Chen et al. extracted from Optics Express 19288.
"Airy beams and accelerating waves: an overview of recent advances" by Nidolaos K. Efremidis et al. extracted from 2334-2536/19/050686-16 Journal © 2019 Optical Society of America.

\* cited by examiner

METASURFACE BASED DEVICE FOR GENERATING ABRUPT AUTOFOCUSING BEAM

This application claims the benefit of U.S. provisional Patent Application No. 63/033,229, filed Jun. 2, 2020, the subject matter of which is incorporated herein by reference.

BACKGROUND OF INVENTION

1. Field of the Invention

The present invention is related to an optical modulation technique and, more particularly, to a metasurface based device for generating abrupt autofocusing (AAF) beam based on metasurface phase modulation element.

2. Description of the Prior Art

Light beams play a significant role in medical science for various applications, including therapy, diagnosis, and fluorescence-guided imaging and surgery. Recently, laser surgery has become a major clinical modality in ophthalmology and dermatology. Dissection or manipulation of sub-cellular structures by laser requires nanoscale precision and size, shape, and position of focal spot play a crucial role. High numerical aperture focusing of light cannot penetrate deep into the tissue due to small working distances and poor axial confinement.

One of the possible approaches to create a high intensity hotspot away from the light source is through the structure and propagation properties of spatial optical modes. One of the limitations of most of the currently used laser surgery devices is their inability to change output spatial modes. Optical beams which produce high intensity contrast between the initial and focal plane with non-diffraction properties is of great importance.

Airy beams in the cylindrically symmetric form are known as the abrupt autofocusing (AAF) beam. It offers additional propagation and focusing properties as a comparison to other non-diffracting beams. During free-space propagation, the AAF beam naturally gets focused without any focusing optical components, and light intensity at the focal plane can reach several orders of magnitude, higher than the input plan. The sudden increase in the light intensity at the focal plane is the most striking feature, very similar to the Bragg effect in proton beam. It may provide significant advantages in laser-tissue interaction process. The physical reason behind this abrupt focusing phenomenon is the formation of the circular symmetric higher order caustics.

SUMMARY OF THE INVENTION

The present invention provides a metasurface based device for generating abrupt autofocusing beam by utilizing a metasurface phase modulation element having a plurality of nano-structures formed on an optical emitting surface of the metasurface modulation element. The AAF beams are peculiar and have two entirely distinct sets of the propagation regions. In the first region, the beam maintains the hollow beam shapes with a strong ring-shaped main-lobe and multiple weak side-lobes. Whereas, in the second region, the focal region beam shows the so-called pseudo-Bessel beam shape, with the strong main-lobe at the center and multiple weak outer side-lobes. By means of the above-mentioned optical features, since the beam maintains the hollow beam shapes, the cells or structures located at the propagation path of the AAF beam will not be damaged by the energy of the AAF beam. Meanwhile, since the focal position of the AAF beam has Bessel effect, the energy could be concentrated so that the optical process, such as medical operation or treatment, could be performed on the object effectively.

In one embodiment, the present invention provides a device for generating AAF beam, comprising an optical module, a metasurface modulation element, and a focus lens. The optical module is configured to generate an incident beam. The metasurface phase modulation element is configured to have a first light receiving surface for receiving the incident beam and a first emitting surface having a plurality of dielectric nano-structures formed thereon for modulating the incident beam into a diffracted light beam, wherein the plurality of nano-structures respectively corresponds to an optical-phase mask pattern corresponding to the circular Airy beam. The focus lens is configured to perform optical Fourier transform of the diffracted light field from the metasurface phase modulation element for forming an AAF beam.

Alternatively, in one embodiment, the emitting optical surface further comprising a plurality of closed-loop structures formed by the plurality of nano-structures, wherein each closed-loop pattern is formed by arranging the plurality of pillar shaped structures having a space apart from each other, and a diameter of the pillar shaped structures of one closed-loop structure is different from the diameter of the pillar shaped structures of the other closed-loop structure. Alternatively, the plurality of closed-loop patters formed a phase mask patterns having a plurality of concentric optical circles having dark regions and bright regions. Alternatively, the plurality of concentric optical circles can be defined as a plurality of sub concentric optical circles located at different areas corresponding to the closed-loop structure.

In one embodiment, the focus lens performs a Fourier transform on the diffracted light beam for forming the AAF beam, and the AAF beam having a focal position, wherein a cross section of the AAF beam along the optical path of the AAF beam between the second optical surface and the focal position is a hollow optical ring, and the focal position having a Bessel-distributed light area.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
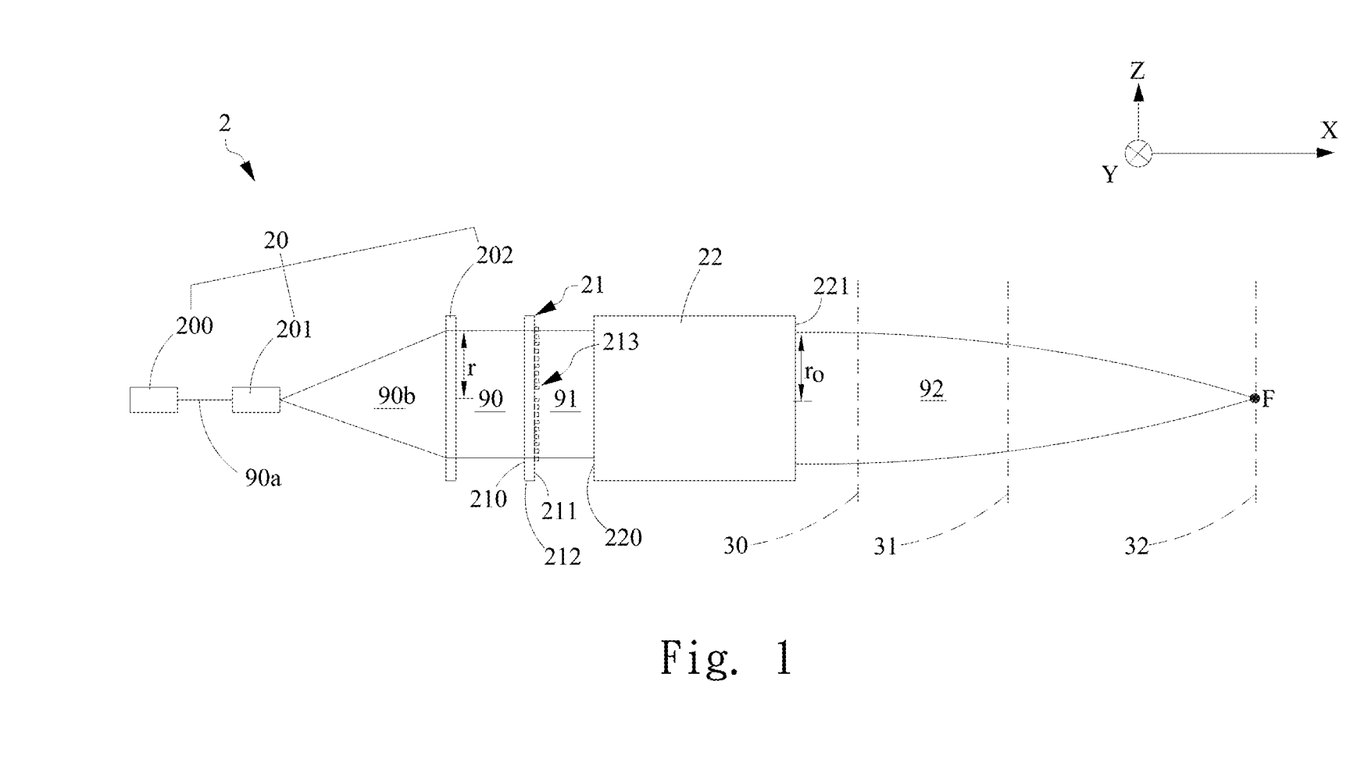
FIG. 1 illustrates a device for generating AFF beam according to one embodiment of the present invention.

Please refer to FIG. 1, which illustrates a device for generating AAF beam according to one embodiment of the present invention. In the present embodiment, the device 2 comprises an optical module 20, a metasurface phase modulation element 21 and focus lens 22. The optical module 20 is utilized to generate an incident light beam 90. In one embodiment, the optical module 20 is a laser module for generating a collimated incident light beam 90. In the present embodiment, the wavelength of the incident light beam 90 generated by the optical module 20 is ranged between visible range or ranged between the infrared range. It is noted that the wavelength range is determined according to the material for making the metasurface phase modulation element and it is not limited to the previously mentioned exemplary range.

In one embodiment, the optical module 20 further comprises a light source 200, a beam expander 201, and collimating element 202. The light source 200 is utilized to generate light beam 90a. The light beam 90a is expanded by the beam expander 201 to formed the light beam 90b having specific size of optical range. The expanded light beam 90b is collimated by the collimating element 202. It is noted that the size of optical range of the incident light beam 90 is formed according to the user's need and the optical elements such as the previously described beam expander, collimating element and so on, are determined according to the user's need. Accordingly, the optical module 20 is not limited to the previously described combination.

The metasurface phase modulation element 21 in the present embodiment is utilized to modulate the incident light beam 90 into a diffracted light beam having different phase delay level, wherein metasurface phase modulation element 21 is formed by a transparent material whereby the incident light can pass there through. The metasurface phase modulation element 21 has a first light receiving surface 210 and a first light emitting surface 211, wherein the light receiving surface 210 is corresponding to the optical module 20 for receiving the incident light beam 90, while the first optical emitting surface 211, in the present embodiment, has a plurality of nano-structures 213 formed thereon. In the present embodiment, the metasurface phase modulation element 21 comprises a substrate 212 having the first optical receiving surface 210 and the plurality of nano-structures 212 formed on the first optical emitting surface 211 opposite to the first optical receiving surface 210.

In the present embodiment, the material for forming the substrate is a transparent material such as sapphire substrate. It is noted that the material of the substrate is determined according to the user's need which is not limited to the sapphire substrate. Other dielectric transparent material is also available. The material for forming the nano-structures 213 is different from the material of the substrate 212. It is noted that, in one embodiment, the plurality of nano-structures 213 are formed on the substrate 212 by electron beam lithography whereby the structures having nano scale can be formed. The material for forming the nano-structures 213 is a transparent dielectric material and is determined according to the wavelength of the incident light beam 90. For example, when the wavelength of the incident light beam 90 is within the range of infrared, the material of the nano-structures can be, but should not limited to, $TiO_2$ or GaN. Alternatively, when the wavelength of the incident light beam is within the range of visible light, the material for forming the nano-structures can be, but should not limited to, amorphous silicon.

In the following, an arrangement of the nano-structures 213 formed on the substrate 212 is explained. Please refer to FIGS. 2A to 2C, which respectively illustrate a full view of an optical phase mask corresponding to the metasurface phase modulation element 21 and partially magnified view of the nano-structures of the metasurface modulation element. In the FIG. 2A, it is an optical phase mask corresponding to the metasurface phase modulation element 21, wherein the optical phase mask further comprises a plurality of concentric optical patterns 214 having dark and bright regions alternated with each other. The concentric optical pattern 214 can be, but should not be limited to, concentric circular pattern or concentric elliptic pattern. In the present embodiment, the concentric optical patterns 214 are concentric circular pattern. Each bright and dark combination represents variation of phase delay level. In one embodiment, the distribution density of the concentric optical patterns 214 is varied from the innermost region to the outermost region of the metasurface phase modulation element 21.

Figures 2A, 2B, 2C:
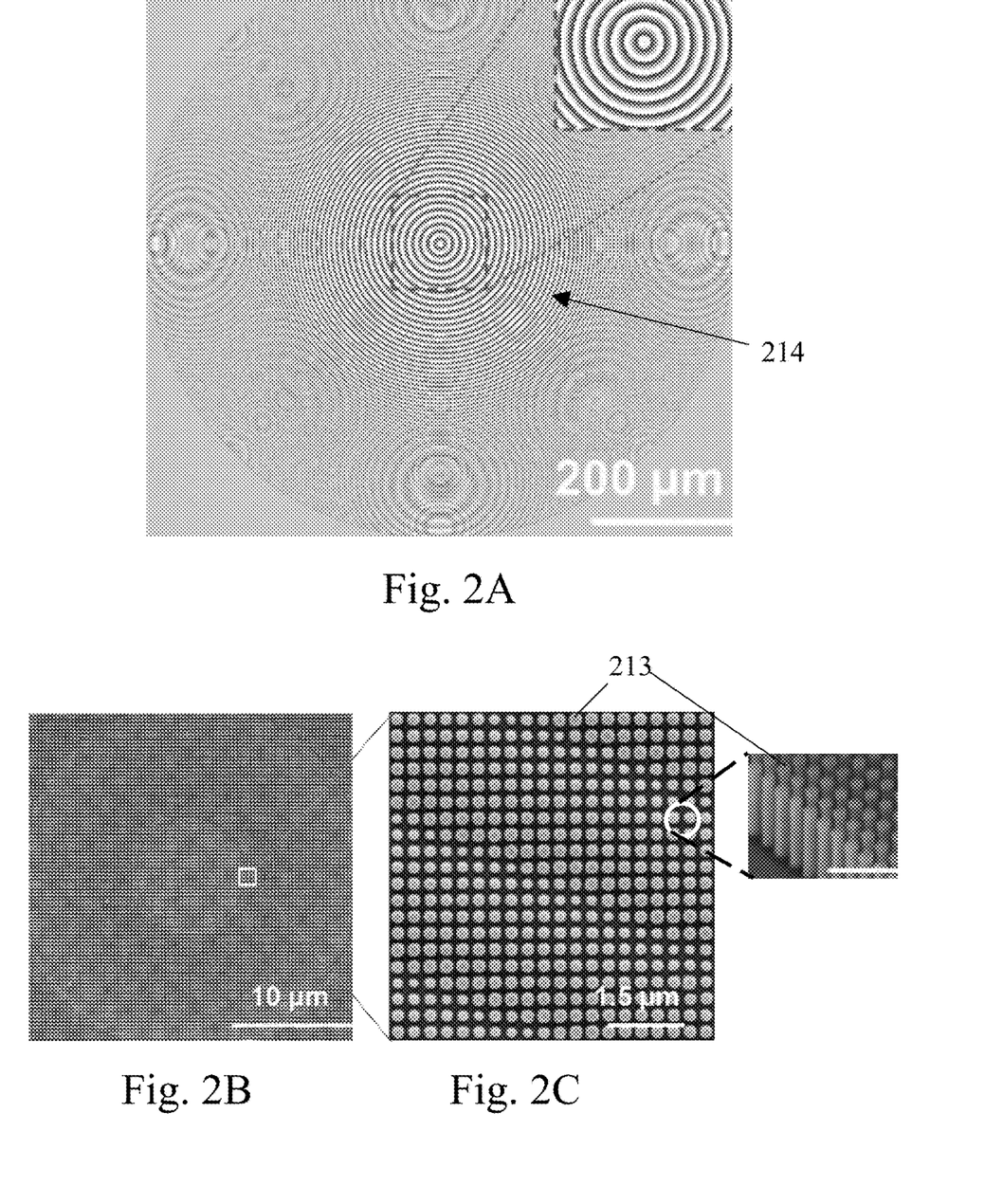
FIGS. 2A to 2C respectively illustrate a full view of an optical phase mask corresponding to the metasurface phase modulation element and partially magnified view of the nano-structures of the metasurface modulation element.
Figure 2D:
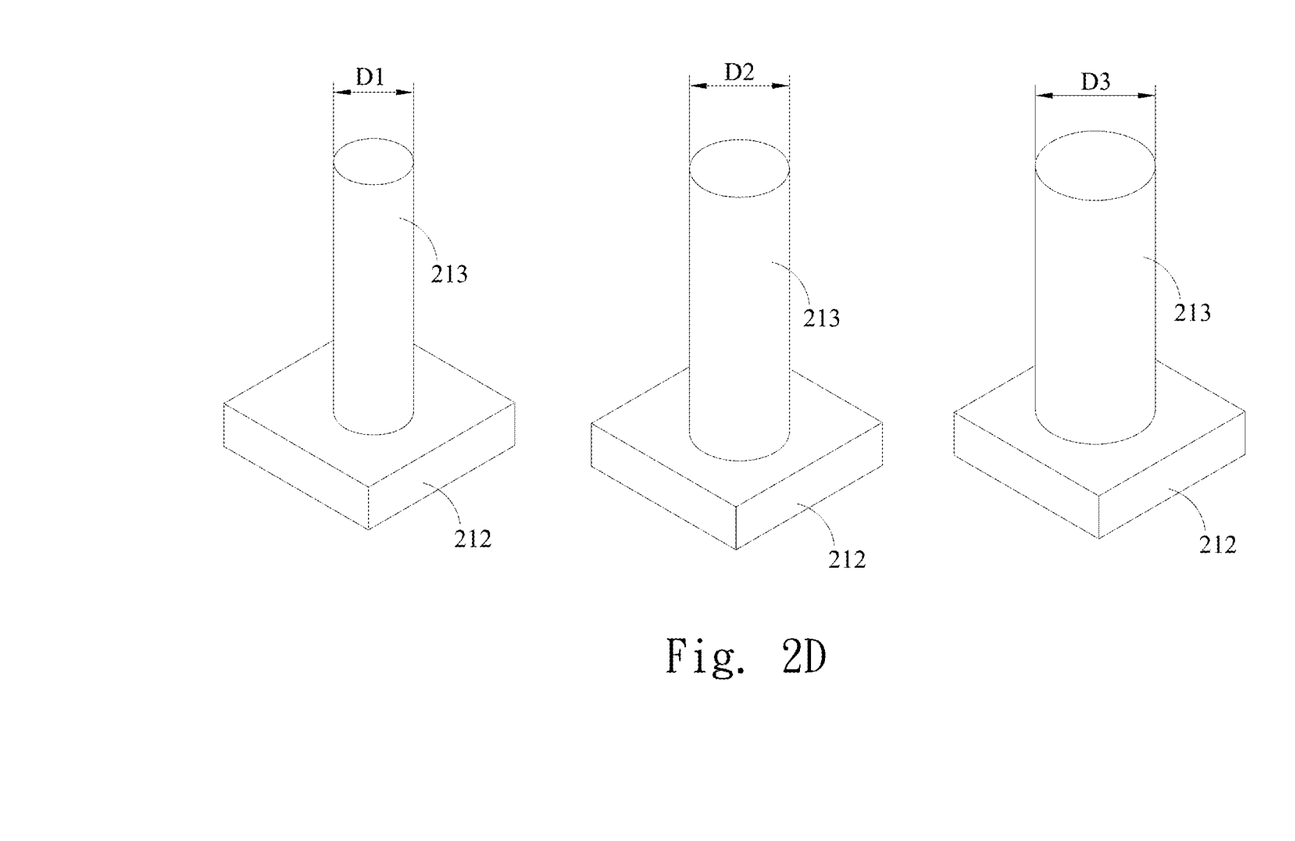
FIG. 2D illustrates the nano-structures having different dimension to provide the different phase delay level according to different embodiments of the present invention.

FIG. 2B illustrates a SEM image top view of zoom-in SEM image of the metasurface phase modulation element 21 while FIG. 2C illustrates a top and magnified tilt view of the nano-structures 213 formed on the first optical emitting surface 211. The arrangement of the nano-structures 213 is determined according to the concentric optical pattern 214. In the present embodiment, the arrangement of the nano-structures 213 has a plurality of closed-loop structures, wherein each closed-loop structure is a circular structure, for example. It is noted that, in the present embodiment, the closed-loop structures are formed by a structure array having a plurality of pillar shaped structures with different diameter, whereby the plurality of closed-loop structures are appeared in the giant top view of first optical emitting surface of the metasurface modulation element. In FIG. 2D, it illustrates the nano pillar shaped structures having different dimension of diameter, wherein the height of the nano-structure 213 is around 800 nm, while the diameter D1~D3 is ranged between 110 nm-200 nm. It is noted that, the dimension of height and diameter of the nano-structures are exemplary embodiments, which are not the limitation of the present invention.

Figure 2E:
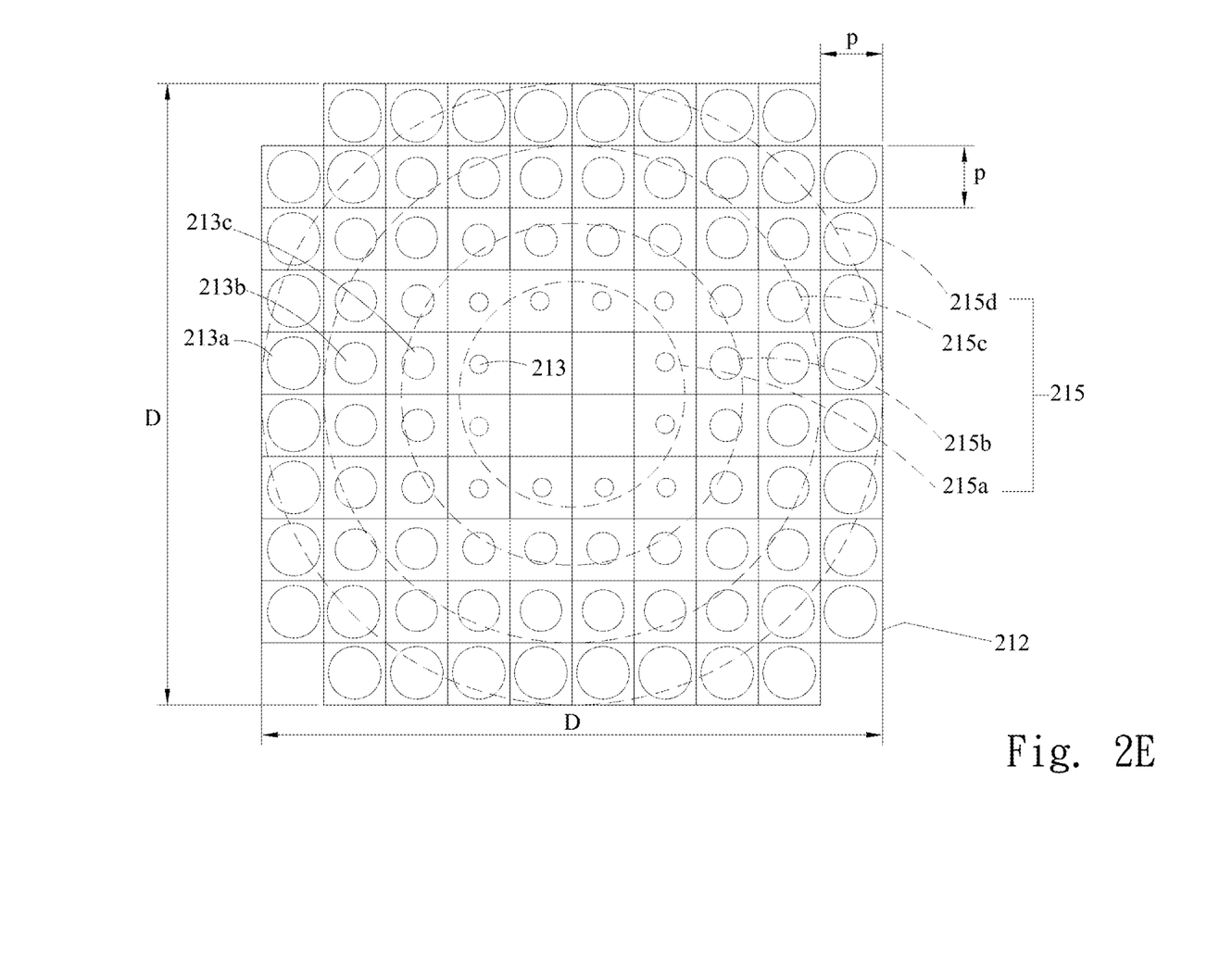
FIG. 2E illustrates the arranged closed-loop pattern by nano-structure which is satisfied the phase requirement of the AAF beam.

Please refer to FIG. 2E, which illustrates an arrangement of the mosaic closed-loop structures formed by the nano-structures according to one embodiment of the present invention. In the FIG. 2E, the closed-loop structure 215 is formed by arranging the nano-structures 213~213c (pillar shaped structures) having different diameter D on the first optical emitting surface 211. Each nano-structures 213~213c is formed on square area (P×P) having dimension 250 nm×250 nm of the substrate 212 such that the center between two adjacent nano-structures is 250 nm.

In the embodiment shown in the FIG. 2E, it illustrates four closed-loop structures 215a~215d on the substrate 212, wherein the innermost closed-loop structure 215a is formed by arranging the nano-structures 213, the outermost closed-loop structure 215d is formed by arranging the nano-structures 213a, and the closed-loop structures 215b and 215c are formed between the closed-loop structure 215a and 215d by arranging the nano-structures 213b and 213c. The arrangement of the nano-structures forms the metasurface structures. In one embodiment, the condition of the phase of the arrangement should meet the criteria of $\varphi=\beta r^3+2\pi\gamma r$, wherein $\varphi$ is spatial phase, $\beta$ control parameter, $\gamma$ is the propagation path of the light beam, and r is the radius of the metasurface phase modulation element 21. It is noted that parameters $\beta$ and $\gamma$ are adjustable parameters related to the spatial phase profile distribution. According to the phase criteria, once the phase mask shown in FIG. 2A is determined, the arrangement of the nano-structures 213 on the substrate 212 can be determined, whereby the phase-only metasurface phase modulation element 21 can be formed for modulating the incident light beam 90 into a diffracted light beam 91. It is noted that the quantities of the closed-loop structures 215a~215d and the dimension of the nano-structures 213~213c are determined according to the user's need. The arrangement shown in the FIGS. 2A to 2E are not the limitation to the present invention.

In the following, the optical phase mask, such as the pattern shown in FIG. 2A, with respect to the nano-structures 213~213c arrangement is explained below. The complex optical field of the AAF beam can be written as following:

$$B_0 = At[(r_0-r)/w]\exp[a(r_0-r)/w] \quad (1)$$

In the equation (1), Ai denotes the Airy function, r is the radius of the metasurface modulation element, $r_0$ is the radius of the diffracted light beam shown in FIG. 1, w is the scaling factor, a is exponential decay factor. During propagation, the beam gets autofocusing at a distance $f_{AAF}$.

$$F_{AAF} = \frac{4\pi}{\lambda}(\pi)^{1/2}(R_0)^{1/2}, \text{ where } R_0 = r_0 + w \quad (2)$$

In our experiments, we generated a computer-generated Fourier plane phase mask to obtain the AAF beam. The method is based on the cubic chirp modulation of the conic phase distribution. According to this method, the AAF beams can be generated by the Fourier transform of the diffracted field from the phase mask of the form shown below.

$$\varphi=\beta r^3+2\pi\gamma r, \quad (3),$$

wherein $\beta$ and $\gamma$ are adjustable parameters related to the spatial phase profile distribution. The diffracted light field is optically Fourier transformed by the focus lens.

Please refer to FIG. 1, the incident light beam 90 passes through the metasurface phase modulation element 21 and is modulated into a diffracted light beam 91. The diffracted light beam 91 enters a second optical receiving surface 220 of the focus lens 22 and is emitted from the second optical emitting surface 221 so as to form the AAF beam 92 focused at a focal position F. In the present embodiment, the focus lens 22 can be an objective, or any lens that can focus the diffracted light 91 into the AAF beam 92. Please refer to FIGS. 1 and 3, wherein FIG. 3 illustrates cross-sectional view of the YZ plane at different location along the optical propagation path of the AAF beam.

In the first region, the beam maintains the hollow beam shapes with a strong ring-shaped main-lobe and multiple weak side-lobes. Whereas, in the second region, the focal region beam shows the so-called pseudo-Bessel beam shape, with the strong main-lobe at the center and multiple weak outer side-lobes. In general, AAF beams may be generated by a spatial light modulator, which has a limitation in terms of power handling capacity, pixelated structures, and bulky size.

Figure 3:
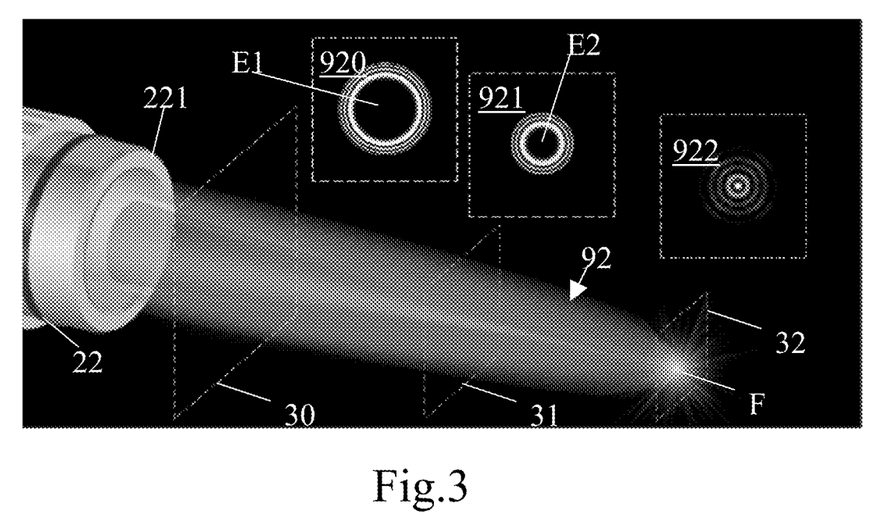
FIG. 3 illustrates different cross-sectional optical images of the AAF beam emitted from the focus lens.

In FIG. 3, the position 30 represents a cross-sectional image 920 when the AAF light a cross-sectional image 920 represents the AAF light emitted from the second optical emitting surface 221 at plane 30, a cross-sectional image 921 represents the AAF beam at middle plane 31, and the cross-sectional image 922 represents the AAF beam focused onto the focal plane 32 to form a single optical point F. In the images 920 and 921, it is clear that the AAF beam maintains the hollow beam shapes with a strong ring-shaped main-lobe and multiple weak side-lobes. Whereas in the image 922, the focal region beam shows the so-called pseudo-Bessel beam shape without any hollow area E1 and E2 like images 920 and 921, with the strong main-lobe at the center and multiple weak outer side-lobes.

Figure 4A:
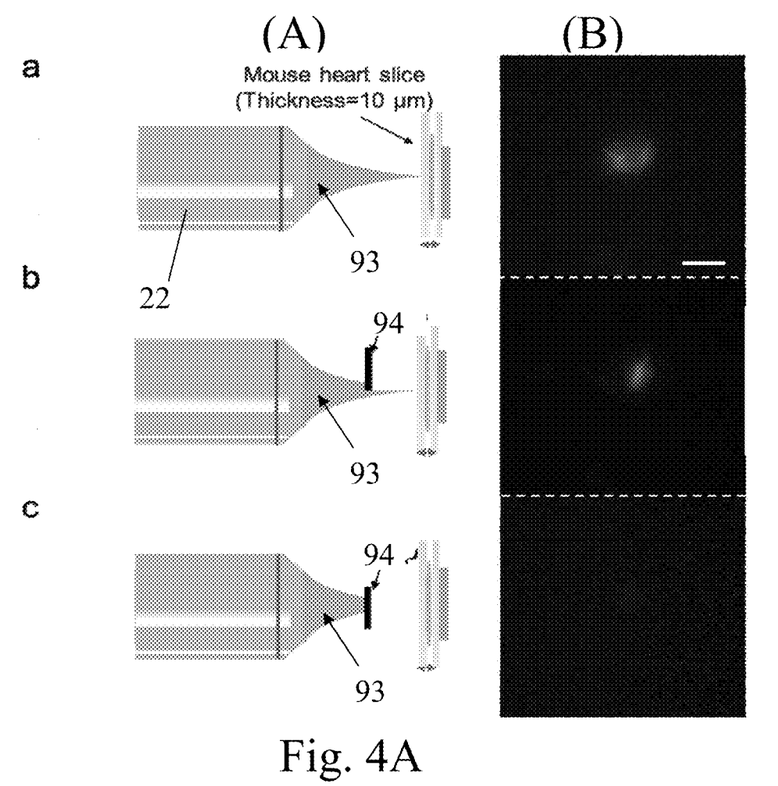
FIG. 4A illustrates optical effect of the conventional Gaussian beam when an obstacle is arranged at the optical path of the Gaussian beam.
Figure 4B:
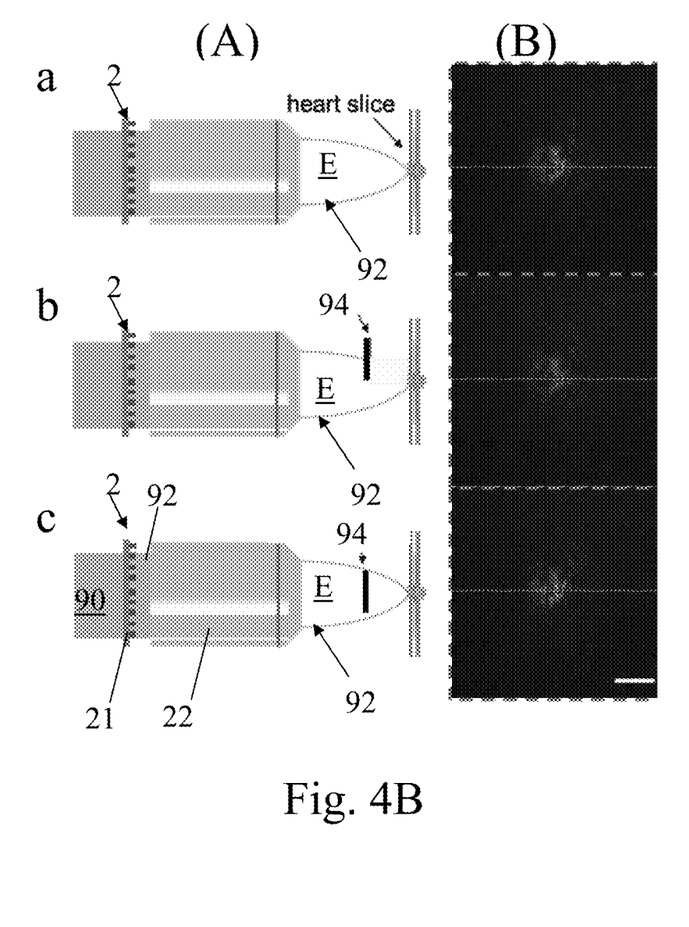
FIG. 4B illustrates optical effect of AFF beam generated by the present invention when an obstacle is arranged at the optical path of the AAF beam.

Please refer to FIGS. 4A and 4B, wherein FIG. 4A illustrates the optical effect of the conventional Gaussian beam when an obstacle is arranged at the optical path of the Gaussian beam while FIG. 4B illustrates optical effect of AFF beam generated by the present invention when an obstacle is arranged at the optical path of the AAF beam. In FIG. 4A, the part (A-a) represents normal Gaussian distribution beam 93 and the part (B-a) at the right side of part (A-a) represents optical intensity image at focal position under the optical condition shown in (A-a).

... The part (A-b) represents normal Gaussian distribution beam 93 having an obstacle 94 partially arranged at the optical path between the objectives and focal position, and the part (B-b) at the right side of part (A-b) represents optical intensity image at focal position under the optical condition shown in (A-b). It is clear that the optical intensity image shown in FIG. 4(B-b) is weakened by the blocking of the obstacle. The part (A-c) represents normal Gaussian distribution beam 93 having an obstacle 94 is arranged at one position of the optical path to completely block the light beam, and the part (B-c) at the right side of part (A-c) represents optical intensity image at focal position under the optical condition shown in (A-c). It is clear that the optical intensity image shown in FIG. 4(B-c) is almost becoming zero by the blocking of the obstacle 94. According to the result shown in FIG. 4A, it is known that the obstacle arranged at one position between the focal position and the objectives could affect the optical intensity of the focal position when the light beam is Gaussian distribution light beam.

However, in FIG. 4B, the part (A-a) represents AAF beam 92 generated by the device 2 and the part (B-a) at the right side of part (A-a) represents optical intensity image at focal position under the optical condition shown in (A-a). The part (A-b) represents AAF beam having an obstacle 94 partially arranged at the optical path between the objectives and focal position, and the part (B-b) at the right side of part (A-b) represents optical intensity image at focal position under the optical condition shown in (A-b). unlike the result shown in FIG. 4A, it is clear that the optical intensity image shown in FIG. 4(B-b) is almost the same as the optical intensity shown in part (B-a). The part (A-c) represents AAF beam 92 having an obstacle 94 is arranged at one position of the optical path to completely block the light beam, and the part (B-c) at the right side of part (A-c) represents optical intensity image at focal position under the optical condition shown in (A-c). It is clear that the optical intensity image shown in FIG. 4(B-c)

is almost the same as the result shown in (B-a). According to the result shown in FIG. 4B, it is known that although the obstacle 94 arranged at one position between the focal position and the objectives, since the AAF beam 92 has hollow part E along the optical path, the optical intensity at the focal position is not affected.

According to the comparison between FIGS. 4A and 4B, after the incident light beam 90 is modulated by the metasurface phase modulation element 21, and focused by the focus lens 22 at the focal position, even if there has obstacle arranged at position of the optical path of AAF beam between the focal position and the focus lens, the optical intensity of the AAF beam at the focal position still be maintained without being weakened. The optical effect of the AAF beam is superior to the optical effect of Gaussian beam when there has an obstacle. By using the abovementioned features of the AAF beam, the cells or structures within the optical path between the focal position and focus lens would not be damaged due to the hollow area and some optical lobes around the hollow area of the AAF beam between the focus lens and focal position such that the device 2 could be applied in the medical field of laser treatment.

According to the exemplary embodiment and comparison result shown above, it is clear that the AAF beams are peculiar and have two entirely distinct sets of the propagation regions. In the first region, the beam maintains the hollow beam shapes with a strong ring-shaped main-lobe and multiple weak side-lobes. Whereas, in the second region, the focal region beam shows the so-called pseudo-Bessel beam shape, with the strong main-lobe at the center and multiple weak outer side-lobes. By means of the abovementioned optical features, since the beam maintains the hollow beam shapes, the cells or structures located at the propagation path of the AAF beam will not be damaged. Meanwhile, since the focal position of the AAF beam has Bessel effect, the energy could be concentrated so that the optical process, such as medical procedures or treatment, could be performed on the object without damaging the objects.

What is claimed is:

1. A metasurface based device for generating an abrupt autofocusing (AAF) beam, comprising:
   an optical module, configured to generate an incident beam;
   a metasurface modulation element, configured to have a first light receiving surface for receiving the incident beam and a first emitting surface having a plurality of dielectric nano-structures formed thereon for modulating the incident beam into a diffracted light beam, wherein the plurality of dielectric nano-structures respectively correspond to an optical-phase mask pattern, wherein an arrangement of the dielectric nano-structures forms a metasurface structure and the phase of the arrangement meets a criteria of $\varphi=\beta r^3+2\pi\gamma r$, wherein $\varphi$ is spatial phase, $\beta$ is control parameter, $\gamma$ is the propagation path of the light beam, and r is the radius of the metasurface modulation element; and
   a focus lens, configured to perform optical Fourier transform of the diffracted light beam emitted from the metasurface modulation element for forming an AAF beam.

2. The metasurface based device of claim 1, wherein the optical module is a laser module, or a white light module.

3. The metasurface based device of claim 1, wherein a plurality of mosaic closed-loop structures are formed by the plurality of nano-structures, each dielectric nano-structure is a pillar shaped structure, and the diameter of the pillar shaped structure in one of the mosaic closed-loop structure is different from the adjacent pillar shaped structure in another mosaic closed-loop structure.

4. The metasurface based device of claim 3, wherein the diameter of each mosaic closed-loop structure formed on the first emitting surface is different from other mosaic closed-loop structures.

5. The metasurface based device of claim 1, wherein the focus lens has a second receiving surface for receiving the diffracted light beam, and a second emitting surface for focusing the diffracted light beam to a focal position, wherein a cross-section of the AAF beam along the optical axis between the second emitting surface and the focal position is a hollow optical ring.

6. The metasurface based device of claim 5, wherein the focal position has a Bessel-distributed light area.

7. The device of claim 1, wherein the metasurface modulation element comprises a dielectric substrate for supporting the dielectric nano-structures and a material of the dielectric nano-structure is dependent on an operating wavelength of the incident light beam.

8. The metasurface based device of claim 7, wherein as the operating wavelength of the incident light beam is in the visible range, the material of the dielectric nano-structure is $TiO_2$ or GaN.

9. The metasurface based device of claim 7, wherein as the operating wavelength is in the infrared region, the material of the dielectric nano-structure is amorphous silicon.

10. The metasurface based device of claim 1, wherein the metasurface phase modulation element is a phase-only modulation element for adjusting the phase of the incident light beam for forming the diffracted light beam.

11. The metasurface based device of claim 1, wherein the optical-phase mask pattern comprises a plurality of concentric optical patterns respectively corresponding to different phase delay levels.

12. A metasurface phase modulation element, comprising a first light receiving surface for receiving an incident beam and a first emitting surface having a plurality of dielectric nano-structures formed thereon for modulating the incident beam into a diffracted light beam, wherein the plurality of dielectric nano-structures respectively corresponding to an optical-phase mask pattern, wherein an arrangement of the dielectric nano-structures forms a metasurface structure and the phase of the arrangement meets a criteria of $\varphi=\beta r^3+2\pi\gamma r$, wherein $\varphi$ is spatial phase, $\beta$ is control parameter, $\gamma$ is the propagation path of the light beam, and r is the radius of the metasurface modulation element.

13. The element of claim 12, wherein a material for making the metasurface modulation element is dielectric material and is dependent on an operating wavelength of the incident light beam.

14. The element of claim 12, wherein the metasurface phase modulation element comprises a sapphire substrate, and a material for making dielectric nano-structures are dependent on a wavelength range of the incident light beam.

15. The element of claim 14, wherein when the wavelength range is visible light range, and the material for making the nano-structure is GaN or $TiO_2$.

16. The element of claim 14, wherein when the wavelength range is infrared light range, and the material for making the nano structure is amorphous silicon.

17. The element of claim 12, wherein the metasurface phase modulation element is a phase-only modulation element for adjusting the phase of the incident light beam for forming the diffracted light beam.

18. The element of claim 12, wherein the optical-phase mask pattern comprises a plurality of concentric optical patterns respectively corresponding to different phase delay levels.

* * * * *